No. 751,116. PATENTED FEB. 2, 1904.
F. STARK.
PHOTOGRAPHIC LENS FOR CAMERAS.
APPLICATION FILED NOV. 5, 1903.
NO MODEL. 2 SHEETS—SHEET 1.
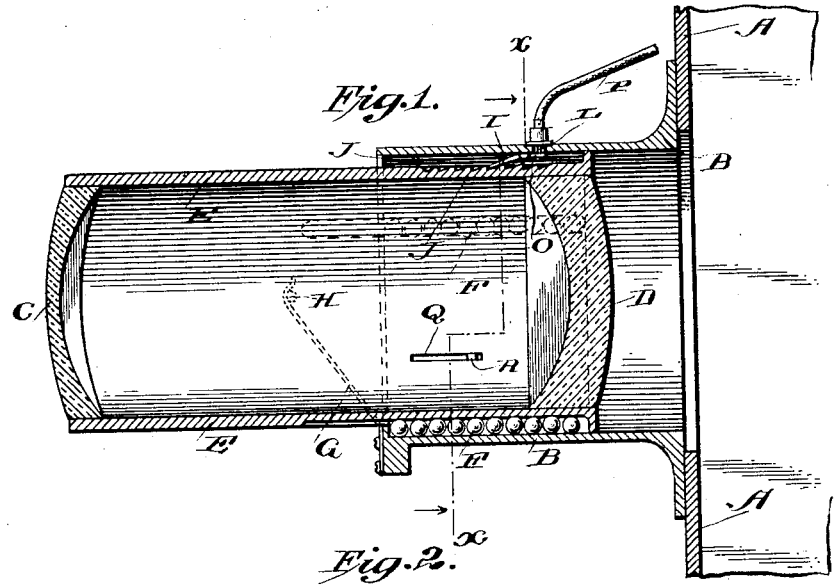
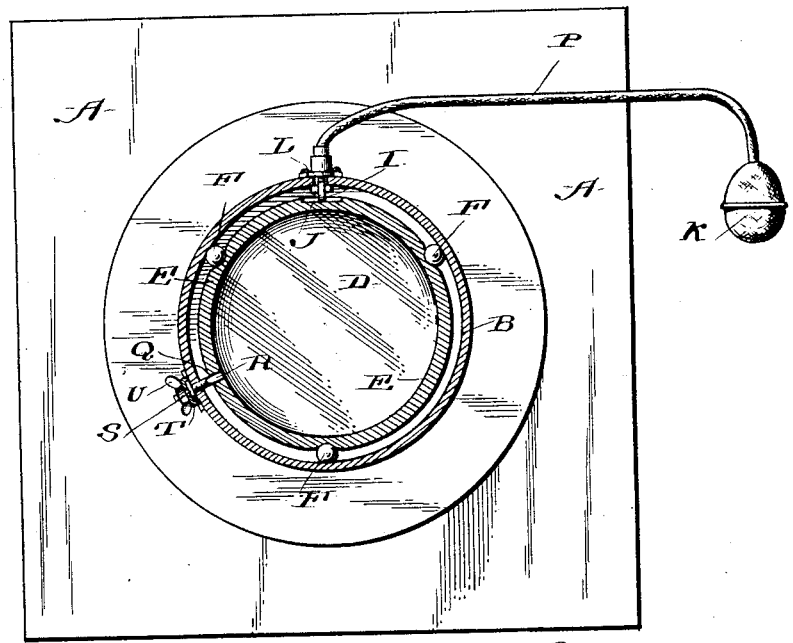
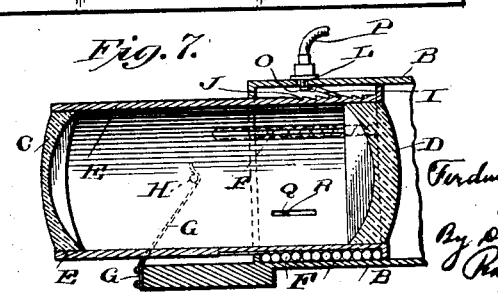

No. 751,116. PATENTED FEB. 2, 1904.
F. STARK.
PHOTOGRAPHIC LENS FOR CAMERAS.
APPLICATION FILED NOV. 5, 1903.
NO MODEL. 2 SHEETS—SHEET 2.
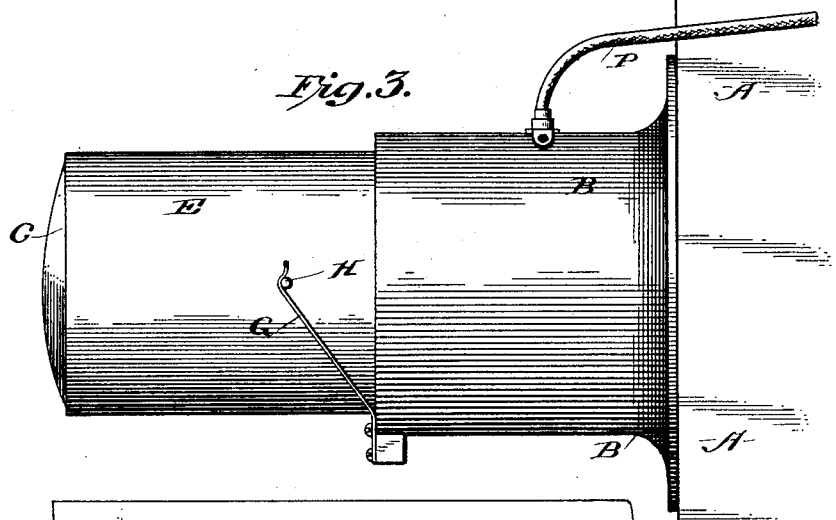
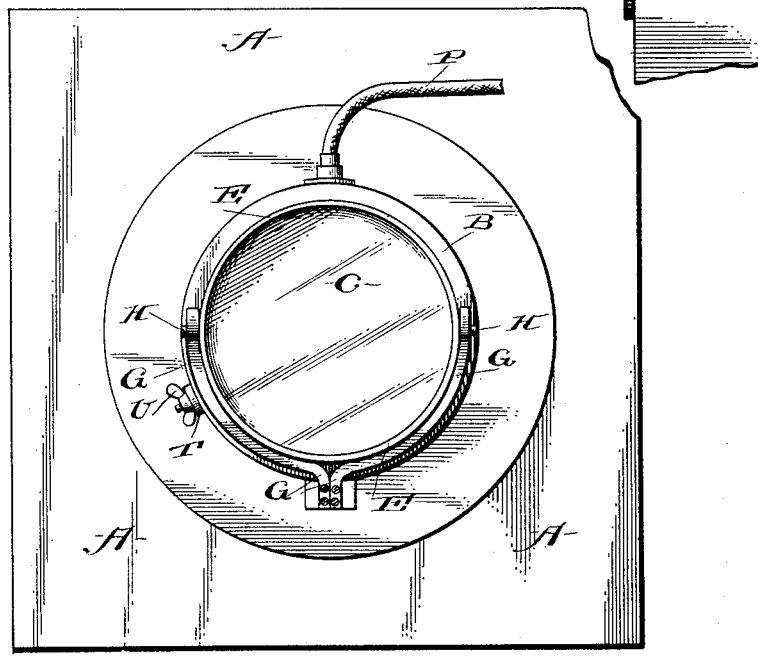
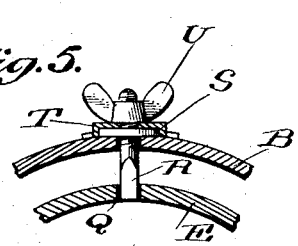
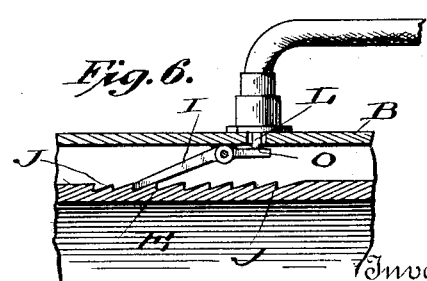

No. 751,116. Patented February 2, 1904.

UNITED STATES PATENT OFFICE.

FERDINAND STARK, OF NEW YORK, N. Y.

PHOTOGRAPHIC LENS FOR CAMERAS.

SPECIFICATION forming part of Letters Patent No. 751,116, dated February 2, 1904.

Application filed November 5, 1903. Serial No. 179,880. (No model.)

*To all whom it may concern:*

Be it known that I, FERDINAND STARK, a subject of the Emperor of Germany, and a resident of the borough of Manhattan, city, county, and State of New York, have invented certain new and useful Improvements in Photographic Lenses for Cameras, of which the following is a specification accompanied by drawings.

This invention relates to photographic lenses for cameras; and its objects are to enable the outlines of the picture to be made more general in outline and less sharp and more like nature or a painting than can be obtained with an ordinary lens having a certain or fixed focus and to prevent certain parts of the picture from being too sharp and other parts from being too indistinct.

Other objects of the invention are to afford provision for obtaining better perspective in the background of a picture of a landscape and to enable the same work to be done by an ordinary lens as is now done by a portrait-lens.

Further objects of the invention will hereinafter appear; and to these ends the invention consists of apparatus for carrying out the above objects embodying the features of construction, combinations of elements, and arrangement of parts having the general mode of operation, substantially as hereinafter fully described and claimed in this specification and shown in the accompanying drawings, in which—

Figure 1 is a longitudinal sectional view of portions of a camera embodying the invention. Fig. 2 is a transverse sectional view on the line $x\ x$ of Fig. 1. Fig. 3 is a side elevation of Fig. 1. Fig. 4 is a front end view. Fig. 5 is an enlarged transverse sectional view of the device for limiting the movement of the lens. Fig. 6 is an enlarged detail sectional view of the device for controlling the movement of the lens. Fig. 7 is a longitudinal sectional view of a portion of a camera operating the reverse of the device shown in Fig. 1.

In order to carry out this invention, the apparatus is so constructed that the focus of the lens is changed during the time of exposure. The focus may be moved either to or from the object, and the amount of movement may be adjusted to suit the conditions. According to this invention the focus of the lens is changed upon a line extending between the object and the camera during the time of exposure. By this means a more general focus is obtained than with ordinary lenses having a fixed focus, and therefore the outlines of the picture appear less sharp and more like nature or a painting.

Referring to the drawings, A represents a portion of the hood of a camera, and B a casing secured thereto.

C and D are the lenses in the casing E.

In order to vary the focus relatively to the object, it is to be understood that any suitable means may be provided, and the camera itself may be movable or a prism may be movable, or, as in this instance, the lens itself may be movable relatively to the camera and to the object.

The invention is understood to cover any form of device that changes the focus during the time of exposure.

In the drawings a suitable apparatus is shown for carrying out the objects of the invention by way of illustration only, as it is obvious that many different devices may be constructed without departing from the spirit of the invention. In this instance the casing E for the lenses C D is movable relatively to the casing B, as shown, being provided with the balls F, forming a ball-bearing. Suitable means are provided for adjusting the amount of movement of the lenses and for controlling said movement, so that the lens moves during the time of exposure.

As shown in the drawings, there is a spring G, secured to the casing B and bearing upon the pin H, connected to the casing E. The spring G is normally under tension and tends to force the lens away from the object. The casing E is held from movement by means of the pivoted pawl I coöperating with the ratchet-teeth J. When the bulb K is pressed, a pin L is forced down upon an inner end O of the pawl I, raising it from engagement with the ratchet-teeth J, and thereby permitting the casing E to be moved under the influence of the spring G. The bulb K and tube P may be separate from the bulb which controls the shutter, or suitable connections may be provided whereby one bulb controls both the shutter and the lens.

In Fig. 7 the apparatus is simply reversed, the spring G in this instance tending to move the lens toward the object. If desired, the apparatus may be so constructed that the lens will be moved in either direction at the will of the operator, according to the particular releasing device which is operated.

In order to limit the extent of movement of the casing E, as shown, a slot Q is provided, into which extends the end of a thumb-screw R, having a collar S, slidable in the guideway T on the casing B. The thumb-piece U may be unscrewed or tightened and the screw R moved along the guideway T and then clamped in position to determine the amount of movement of the casing E. Any other suitable means may be provided for carrying out this object, and any suitable means may be provided in place of the ratchet and teeth for controlling the movement of the lens.

Obviously some features of this invention may be used without others, and the invention may be embodied in widely-varying forms.

Therefore without limiting the invention to the construction shown and described or enumerating equivalents I claim, and desire to obtain by Letters Patent, the following:

1. The combination with a camera, of a lens, and means for changing the focus of the lens during the time of exposure, for substantially the purposes set forth.

2. The combination with a camera, of a lens, and means for changing the focus of the lens to and from the object during the time of exposure, for substantially the purposes set forth.

3. The combination with a camera, of a lens, and means for moving the lens to and from the object during the time of exposure, and means for adjusting the amount of said movement, for substantially the purposes set forth.

4. The combination with a camera, of a lens, and means for changing the focus of the lens during the time of exposure substantially upon a line extending between the object and the camera, for substantially the purposes set forth.

In testimony whereof I have signed this specification in the presence of two subscribing witnesses.

FERDINAND STARK.

Witnesses:
 RUDOLPH HANNOCH,
 LOUIS F. ROSSOW.